United States Patent
Lutz et al.

[11] Patent Number: 5,168,320
[45] Date of Patent: Dec. 1, 1992

[54] COLORIMETER

[76] Inventors: Carl D. Lutz, 12 Hubbard Hill Rd., Derry, N.H. 03038; Thomas A. Lianza, 60 Cider Hill Rd., Bedford, N.H. 03102

[21] Appl. No.: 322,217

[22] Filed: Mar. 13, 1989

[51] Int. Cl.$^5$ .............. G01J 3/51; G01N 21/27; G01N 21/47
[52] U.S. Cl. .................... 356/73; 356/402; 356/404; 356/419; 356/446
[58] Field of Search ........... 356/73, 402, 416, 418, 356/419, 405, 406, 404, 445, 446

[56] References Cited
U.S. PATENT DOCUMENTS

| | | | |
|---|---|---|---|
| 2,427,795 | 9/1947 | Lessler | 356/443 |
| 2,427,922 | 9/1947 | Raymond | 356/443 |
| 3,367,230 | 2/1968 | Williams | 356/419 |
| 3,473,878 | 10/1969 | Schweitzer | 356/446 |
| 3,697,179 | 10/1972 | Pfaffenberger et al. | 356/73 |
| 3,846,027 | 11/1974 | Hyman et al. | 356/418 |
| 4,053,235 | 10/1977 | Hampton et al. | 356/418 |
| 4,632,558 | 12/1986 | Maassen et al. | 356/404 |

Primary Examiner—Vincent P. McGraw

[57] ABSTRACT

A colorimeter for measuring transmitted, reflected, emitted and incident light comprises a pod that is demountably attached to a base and that contains a color-responsive detector and associated processing electronics. The detector mates with one of several detachable heads that are selectable to establish precise measuring conditions for the various measurements to be made. The colorimeter enables common and consistent calibration across all elements of the pre-press industry, from checking color proofs or color transparencies, to calibrating video color monitors.

10 Claims, 7 Drawing Sheets

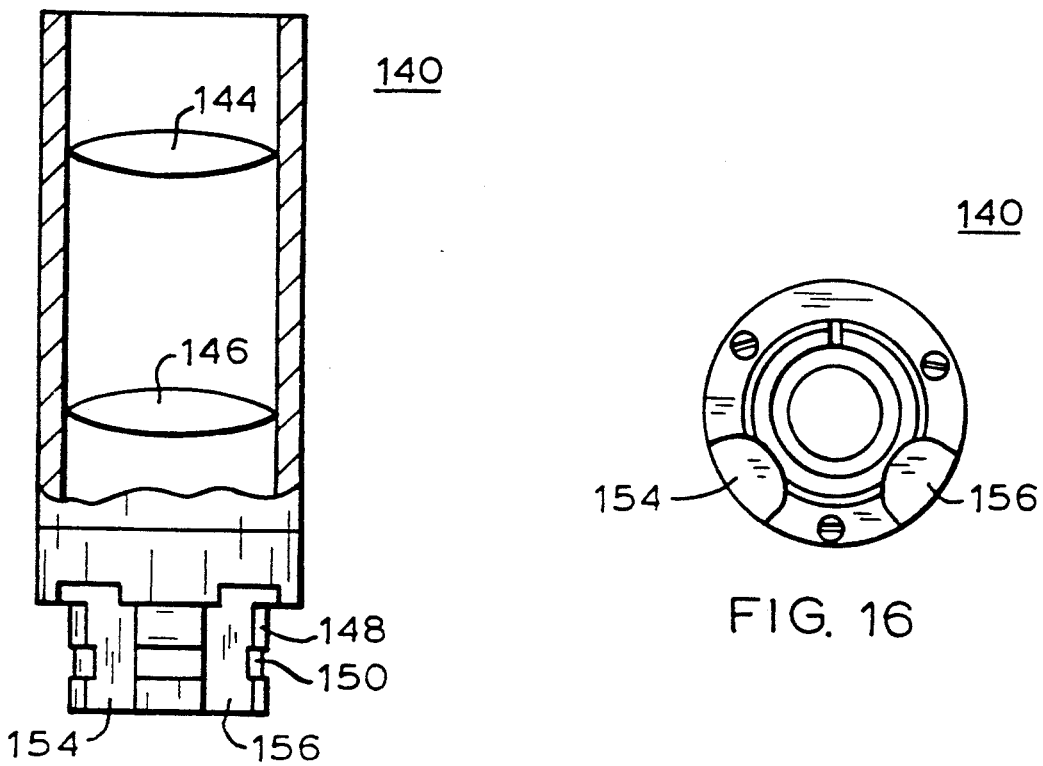
FIG. 15
FIG. 16
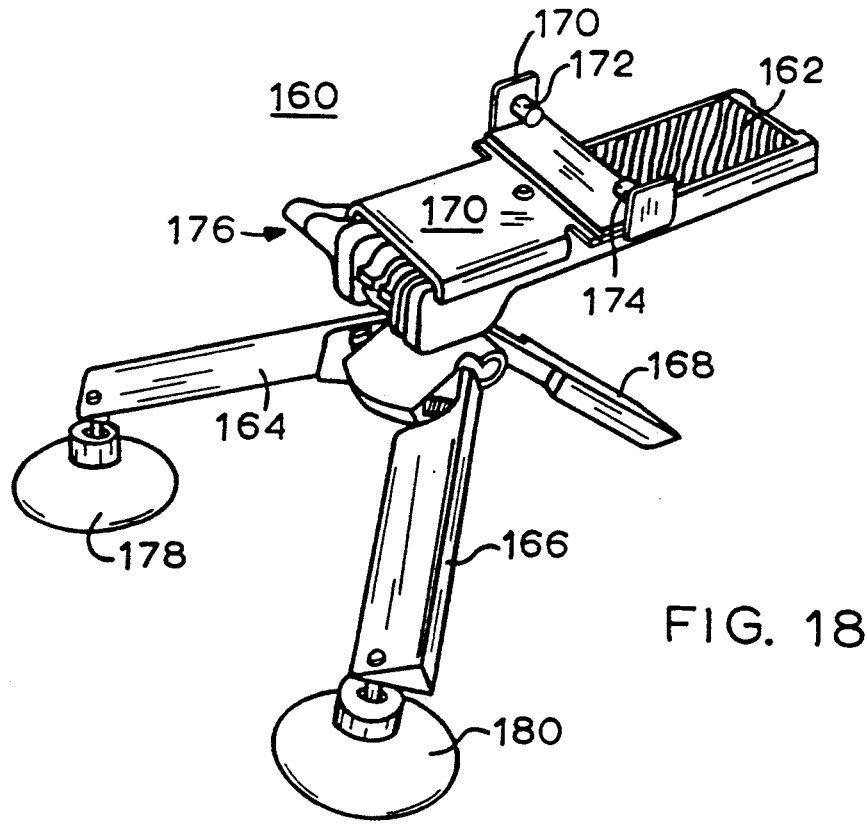
FIG. 18

COLORIMETER

BACKGROUND OF THE INVENTION

A. Field of the Invention

The invention relates to colorimeters, and comprises a colorimeter capable of measuring transmitted, reflected, emitted and incident light.

B. Prior Art

Colorimeters are used to measure the color content of light. They are employed in diverse fields, and their design is often constrained by the particular requirements of those fields. Thus, a colorimeter designed for use in one field is often unsuitable for use in another.

Further, some fields have such diverse requirements that no one instrument has heretofore been suited for all the varying measurements required. For example, in the field of electronic pre-press editing, it is routinely necessary to measure the color content of printed hardcopy material (reflection measurements), photographic film (transmission measurements), video monitors (emission measurements), and ambient illumination (incident light measurements). Although it is desirable that such measurements be made with a single instrument, thus providing the benefit of common calibration, heretofore this was not commonly done, because of the restricted design of existent colorimeters.

II. Description of the Invention

A. Objects of the Invention

Accordingly, it is an object of the present invention to provide an improved colorimeter.

It is a further object of the invention to provide an improved colorimeter that is adapted to make transmission, reflection, emission and incident light colorimetric measurements.

It is yet another object of the invention to provide an improved colorimeter that establishes uniform conditions for measurement of color content in varying modes of operation.

B. Brief Summary of the Invention

In accordance with the present invention, a colorimeter for measuring transmitted, reflected, emitted and incident light comprises a pod demountably attached to a base and containing a color-responsive detector and associated signal processing electronics. The detector mates with one of several detachable heads which are selectable to establish precise measuring conditions for the varying measurements being made.

For example, a first head, used for measuring transmitted, reflected, or emitted light, is detachably mounted to the detector and has apertures of precisely defined shape to transmit illuminating light from a source mounted on the detector housing to the object being measured. The head ensures a fixed distance between the detector and the object. The apertures not only ensure illumination at a precise and defined angle, but also provide an optical stop that is positioned with respect to the source of illumination in such a manner as to encompass all or a major portion of the illuminating source, despite unintended misalignments due to manufacturing tolerances. Further, the head is shaped to block direct specular reflection of the illuminating light into the detector, to thereby enhance the signal to noise ratio of the color measurement. The head is spring-fitted directly to the detector housing, to thereby ensure that the object-detector distance is repeatably fixed., while allowing ready attachment and detachment of the head.

A second head, used for measuring incident or ambient light, similarly is spring-fitted to the detector. It contains two or more lenses for gathering light over a defined angle and transmitting it to the detector. Like the first head, it is fitted directly to the detector so as to maintain a precise distance between the first lens element and the detectors.

The pod is attached to the base by a pair of spring-loaded apertures which mate with a corresponding pair of shoulders on the base. Accordingly, it readily removable from the base for measurements as desired. It is constructed to fit comfortably within the hand, and thus readily accomodates the varying measurement needs of environments such as the electronic prepress industry, among others. This configuration is particularly useful for measuring emitted light, such as from a video screen.

For the latter measurement, a tripod structure is further provided which contains a pair of arms, similar to those on the base, onto which the spring-loaded apertures of the pod snugly fit. The tripod has at least a pair of suction feet for fixing the tripod to the screen while measurements are being made with the pod.

C. Detailed Description of the Invention

The above and other and further objects and features of the invention will be more readily understood on reference to the following detailed description of the invention when taken in conjunction with the accompanying drawings, in which:

FIG. 15 is a vertical sectional view of a second head used in the colorimeter of the present invention;

FIG. 16 is an end view of the head of FIG. 15;

FIG. 18 is a view in perspective of a further base for the colorimeter of the present invention that is especially useful for color measurements of emitting sources such as video screens.

Figure 7:
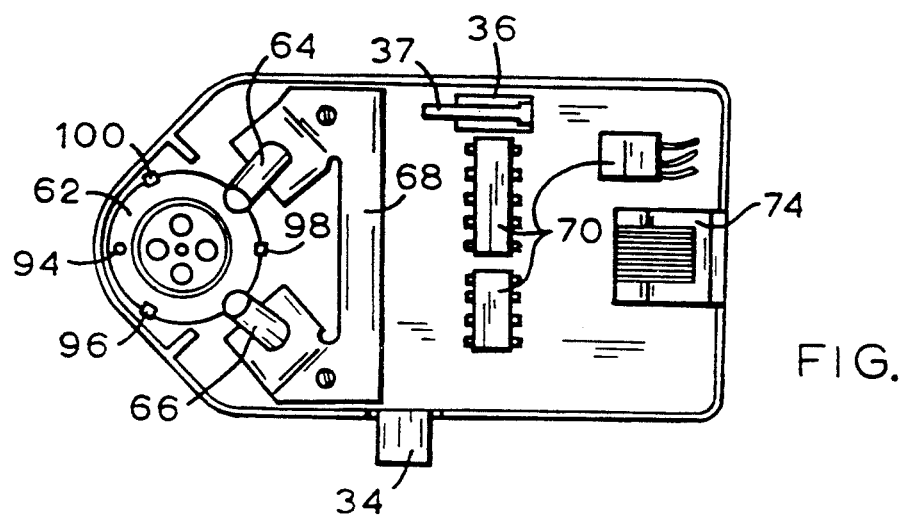
FIG. 7 is a plan view of the structure of FIG. 6 further showing the structure and positioning of the detector module and other components.
Figure 8:
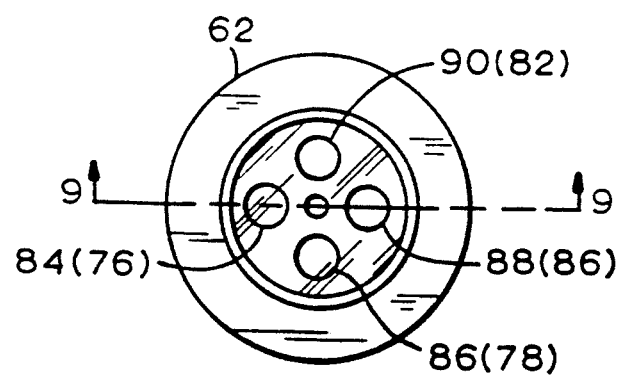
FIG. 8 is an enlarged end view of the detector module showing the separate detector elements.
Figure 9:
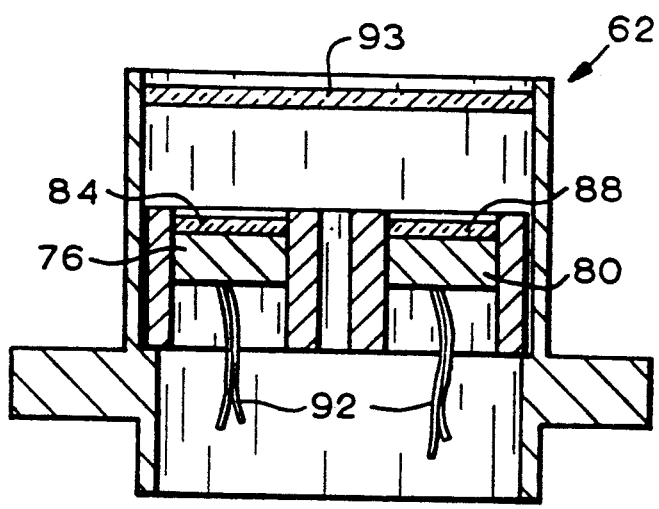
FIG. 9 is a side sectional view of the detector module taken along the lines 9—9 of FIG. 8.
Figure 10:
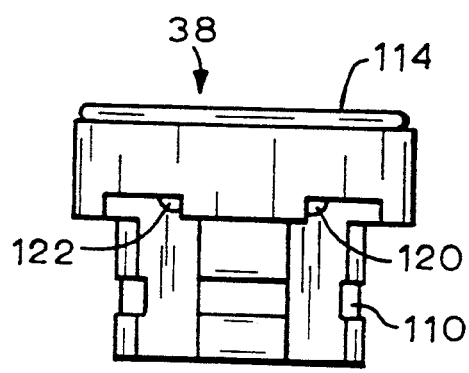
FIG. 10 is a side elevational view of a first head used in the colorimeter of the present invention.
Figure 11:
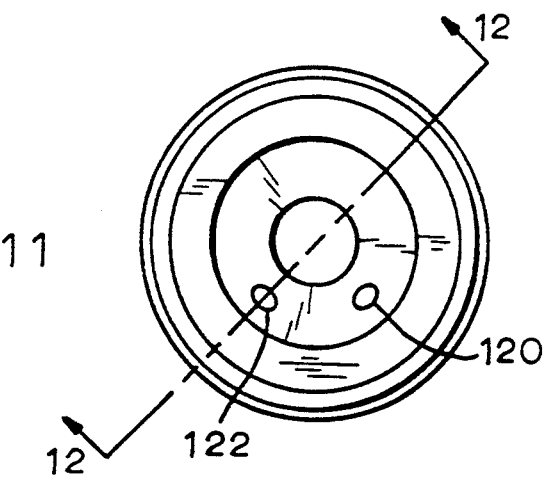
FIG. 11 is an end view of the head of FIG. 10.
Figure 12:
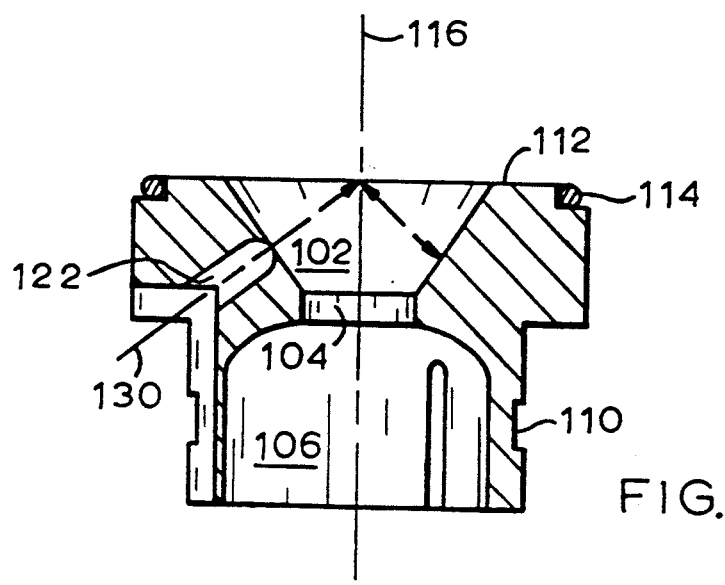
FIG. 12 is a vertical sectional view of the head of FIG. 10 along the lines 12—12 of FIG. 11.
Figure 13:
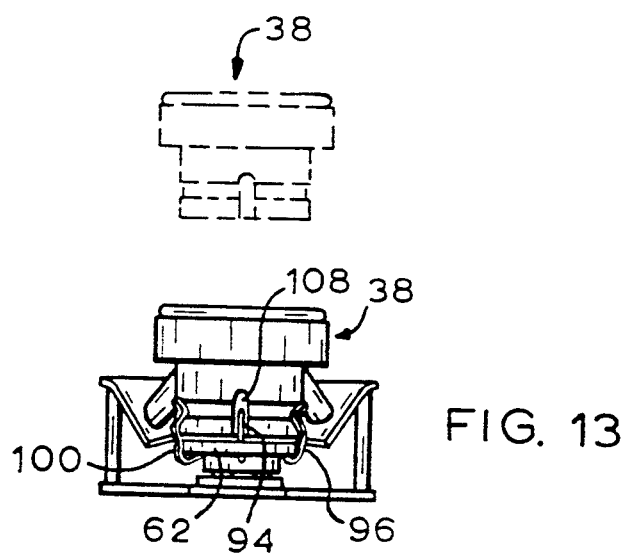
FIG. 13 is an exploded view showing the connection of the head of FIG. 10 to the detector module.
Figure 14:
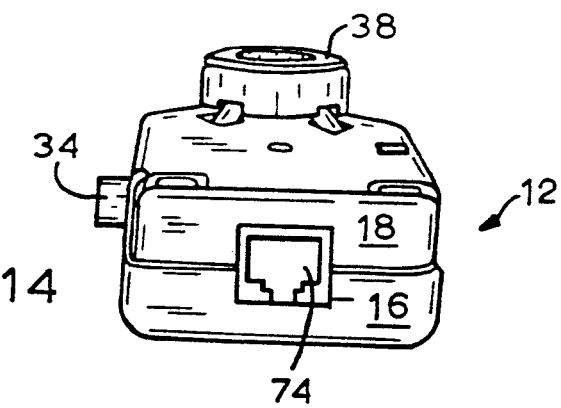
FIG. 14 is an end view of the colorimeter of FIG. 1 showing the bus connection to further processing and display components.
Figure 17:
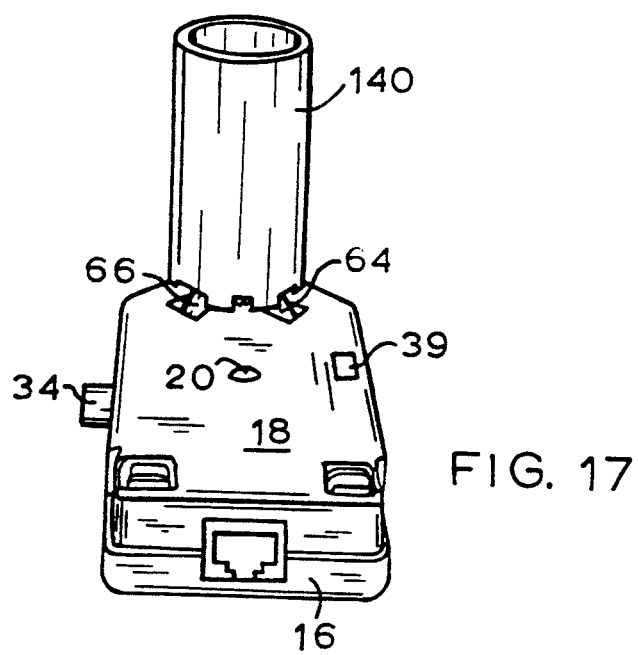
FIG. 17 is a view in perspective of the colorimeter of the present invention as fitted with the second head.

As seen more particularly in FIGS. 1–4, the colorimeter 10 of the present invention comprises a pod 12 and a base 14 mounted thereto. The pod 12 is formed from an upper housing 16 and a lower housing 18 secured to each other by a screw 20 extending through the interior from one housing to the other. Slots 20 and 22 (FIG. 4), respectively, in the lower housing are provided for detachably mounting the pod 12 to the base 14. Spring clips 24–30 secure the pod when it is so mounted. A first spring-loaded switch 34 is mounted on one side of the pod 12, and a second spiring-loaded switch 36 (FIG. 7) having an arm 37 is contained within the pod and accessed through an aperture 39 in housing 16. A head 38 is detachably mounted thereto, as described in further detail below.

Figure 2:
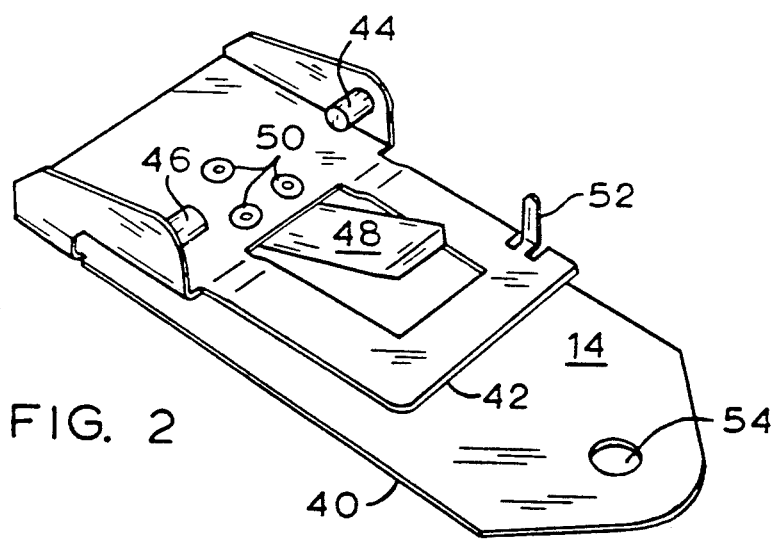
FIG. 2 is a view in perspective of the base of the colorimeter of FIG. 1, showing its construction in more detail.
Figure 3:
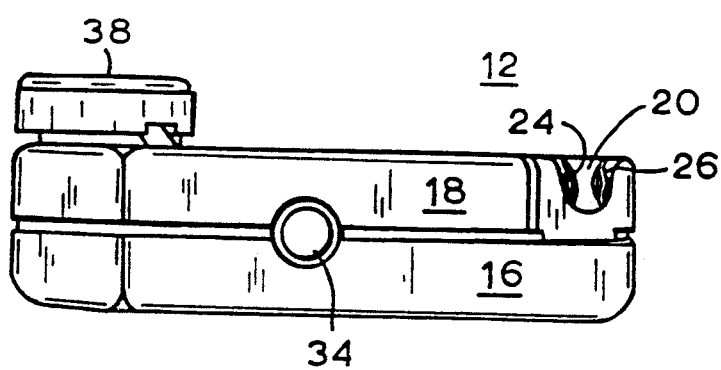
FIG. 3 is a side elevation view of the pod of the colorimeter of FIG. 1.
Figure 4:
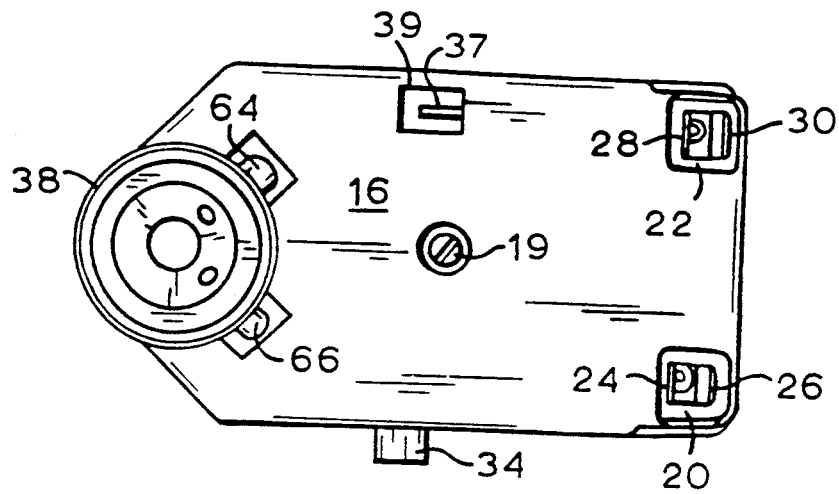
FIG. 4 is plan view, from the underneath, of the colorimeter of FIG. 1.
Figure 5:
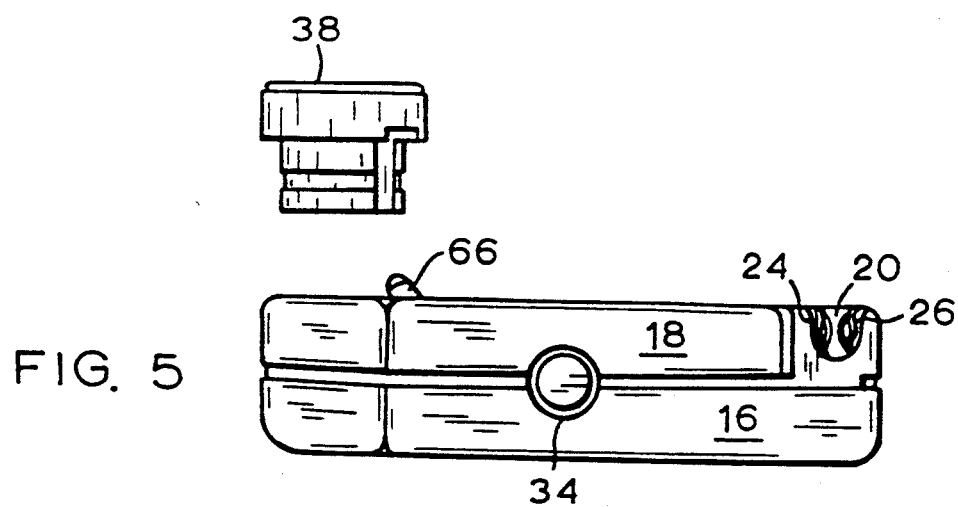
FIG. 5 is a side elevational view of the colorimeter of FIG. 1 with a head removed therefrom to show the illuminating sources.
Figure 6:
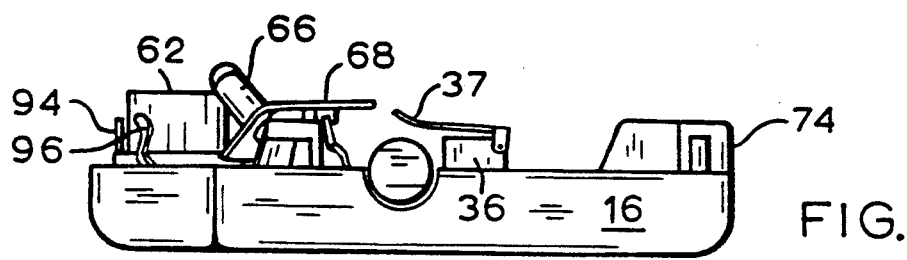
FIG. 6 is a side elevational view of the colorimeter of FIG. 5 with the bottom cover removed therefrom to show the structure and positioning of the detector module in more detail.

Turning now more specifically to FIG. 2, the base 14 is formed from an elongated foot 40 having formed thereon a cantilevered plate 42. Extending from side walls of plate 42 are shoulders 44 and 46. These shoulders engage with the spring clips 24–30 of pod 12 when the latter is mounted on the base to detachably secure the pod to the base while allowing rotation of the pod. A spring arm 48 extends upwardly from the plate 40 and is secured thereto by rivets 50. Finger 52 also extends upwardly from the plate 42. Finger 52 extends into the aperture 37 on pod 12 when the latter is mounted to the base 14. Spring arm 48 rests against the bottom housing 18 of pod 12 and normally prevents the finger 52 from actuating switch 36. However, when measurements are to be made, by pressing downwardly on the pod, the operator can depress spring 48 sufficiently to cause finger 52 to actuate switch 36.

An aperture 54 is also formed in the foot 40 of base 14. The aperture lies directly below the head 38 and defines the extent of the object which is seen by the head 38 or any other head in its place.

Turning now to FIGS. 6–9, the interior of the pod is shown in more detail. A printed circuit board 60 mounted in the lower housing 18 has mounted thereon a detector module 62, a pair of light sources 64, 66 mounted on a bracket 68, signal processing electronics 70, and an electrical signal connector 72, in addition to previously described components such as switches 34 and 36. Surrounding the detector module are a locating pin 94 (FIG. 7) and spring clips 96–100, respectively. These are used in mounting various removable heads to the detector, as will be described shortly. All the detecting and processing components are mounted on the board, which is removably mounted in the housing 18.

The detector module 62 is formed from a generally cylindrical shell containing an array of photodetectors 76–82 covered by filters 84–90, respectively. The filters 84–90 comprise red, green, blue, and neutral filters, respectively, so that the three primary colors red, green and blue are detected by corresponding ones of the photodectors, while one of the photodetectors receives light incident thereon without filtration. A broadband filter 93 filters out ultraviolet or infrared light that might otherwise interfere with the measurements to be made. The output of the detectors is passed through leads 92 to signal processing circuitry on the board 60, and thence via connector 74 to further processing and display devices (not shown) as desired.

Figure 1:
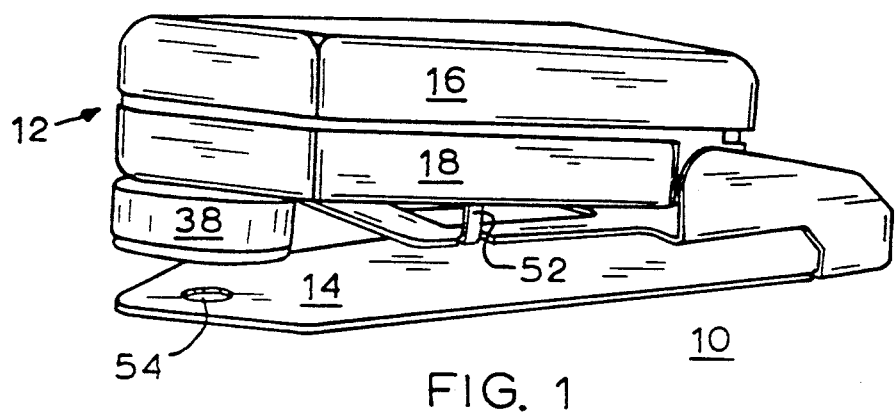
FIG. 1 is a view in perspective of an improved colorimeter in accordance with the present invention.

Turning now to FIGS. 10–14, a first removable head is shown in detail. This head is used primarily in measuring transmitted, reflected and emitted light. The head comprises a generally cylindrical body having a conical entrance 102, a narrow throat 104, and a chamber 106. A vertical slot 108 in the wall of the head 38 receives the locator pin 94 (FIGS. 3, 13) to thereby orient the head in the circumferential direction with respect to the detector 62 when the head is mounted thereon. Similarly, a circumferentially-extending grove 110 receives the spring clips 96, 98, 100, to thereby securely lock the head in place on the detector. This fixes the distance between the plane of the upper face 112 of the head and the detectors themselves, and thus fixes the distance between the object being analyzed and the detectors when the face 112 is brought to its measuring position with respect to the object being analyzed. A resilient O-ring seal 114 around the periphery of the face 112 helps to provide a light tight seal for measurements. When mounted on the detector module, the centerline 114 of the head is generally aligned with the centerline of the measuring aperture 54 of the base 14 (FIG. 1).

In the case of a reflection measurement, base 14 is typically placed on the surface being analyzed, and the head 38 pressed down into contact with the base. In the case of a transmission measurement, the object being analyzed (e.g., a photographic film) is placed between the base 14 and the head 38 and the head is then pressed against the object to fix the distance between the object and the detectors. Thus, repeatable measurements are ensured.

Channels 120, 122 are formed in the underside of the head 38 and extend into the conical entrance 102 at an oblique angle to the face 112, preferably, an angle of 45 degrees. The channels are wider at the inner end of the illumination (i.e., the end adjacent the light sources), but taper at the outer end (i.e., the end closest the cavity 102) and have a narrow lip at that end. This is equivalent to providing a conical channel. At the outer end, the width of the channel is comparable to the length of the filament of the lamp which is used to illuminate the object, while at the inner end (nearest the object) the channel is considerably narrowed. When the head is mounted on the detector module, the channels are aligned with light sources 64, 66, respectively (see, e.g., FIGS. 4, 5, 7, 13 and 14). When making reflection measurements, light is passed through the channels from the light sources 64, 66 to the object being analyzed. With this construction, small misalignments of the head with respect to the lamp source will have minimal effect on the magnitude of the illumination incident on the object, and thus on the accuracy of the measurement.

It should further be noted that the construction of the head 38 is such that direct (specular) reflection of the illuminating rays is blocked from the detector. Thus, considering a typical ray 130 (FIG. 12) from the lamp, it passes through channel 122 and is incident on the object (not shown) pressed against the face 112. On reflection from this object, it impinges on the sloped wall of chamber 102, and is reflected outwardly of the head back toward the object. Thus, it is blocked from passage into the chamber 106 and the detector module behind this chamber. This construction thus improves the signal to noise ratio.

In typical use, the pod 12 mounted on the base 14 is brought to the object to be measured. In the case of a reflection measurement such as from a printed sheet, the base 14 is paced flat against the sheet. The operator then presses lightly down on the pod, thereby slightly deforming the cantilever arm 42 and pressing the head 32 against the paper. The resilient seal around the head forms a light-tight seal around the aperture 54. At the same time, the spring 48 slightly deforms and allows the finger 52 to depress switch arm 37 and thus actuate switch 36. This generates a signal ("ready") indicating that the unit is is position for measurement. The object is then illuminated via the light sources 64, 66, and the operator then depresses switch 34 to generate a further signal ("measure") that begins the taking and recording of data. In the preferred embodiment of the present invention, the measured data is fed from the pod to a processor via connector 74 for further processing and display. This allows the greatest flexibility for signal processing and analysis, and additionally allows real-time control of industrial process by signals supplied by the pod. Of course, a display may be mounted on the pod itself if desired, and all the processing may be done within the pod if desired.

In the case of transmission measurements, the object to be analyzed (e.g., photographic film) is positioned between the base 14 and the head 38, and the head pressed gently against the film to form a light tight seal in the area of measurement around the aperture 54. The object is illuminated from below from an external light source (not shown) and the appropriate measurement is made as before, the switch 36 being actuated as previously on rotating the head sufficiently toward the object, and the switch 34 being actuated by the operator when the measurement is to be made.

In addition to making measurements with the pod mounted on the base, the pod may readily be removed from the base and measurements made with the pod held in the hand. To this end, the pod is configured much like a "mouse", and is readily and comfortably usable.

FIGS. 15 and 16 show an alternative head useful in the present invention in connection with measurements of incident light. The head 140 is formed from a generally cylindrical tube 142 having first and second lenses 144, 146 mounted therein. The lower end terminates in a generally cylindrical connector 148 having circumferentially extending groves 150 for mating with spring arms 96, 98, 100 of detector module 62 when head 140 is mounted thereon. Cutouts 152, 154 are provided to accommodate fitting to the light sources 64, 66 but no light transmission channels are provided since this head is not used in localized reflection measurements. The lenses focus the collected light on the photodetectors, and help preserve a constant luminance throughout the optical path between the object being analyzed and the detectors so that accurate luminance measurements may be made.

Figure 19:
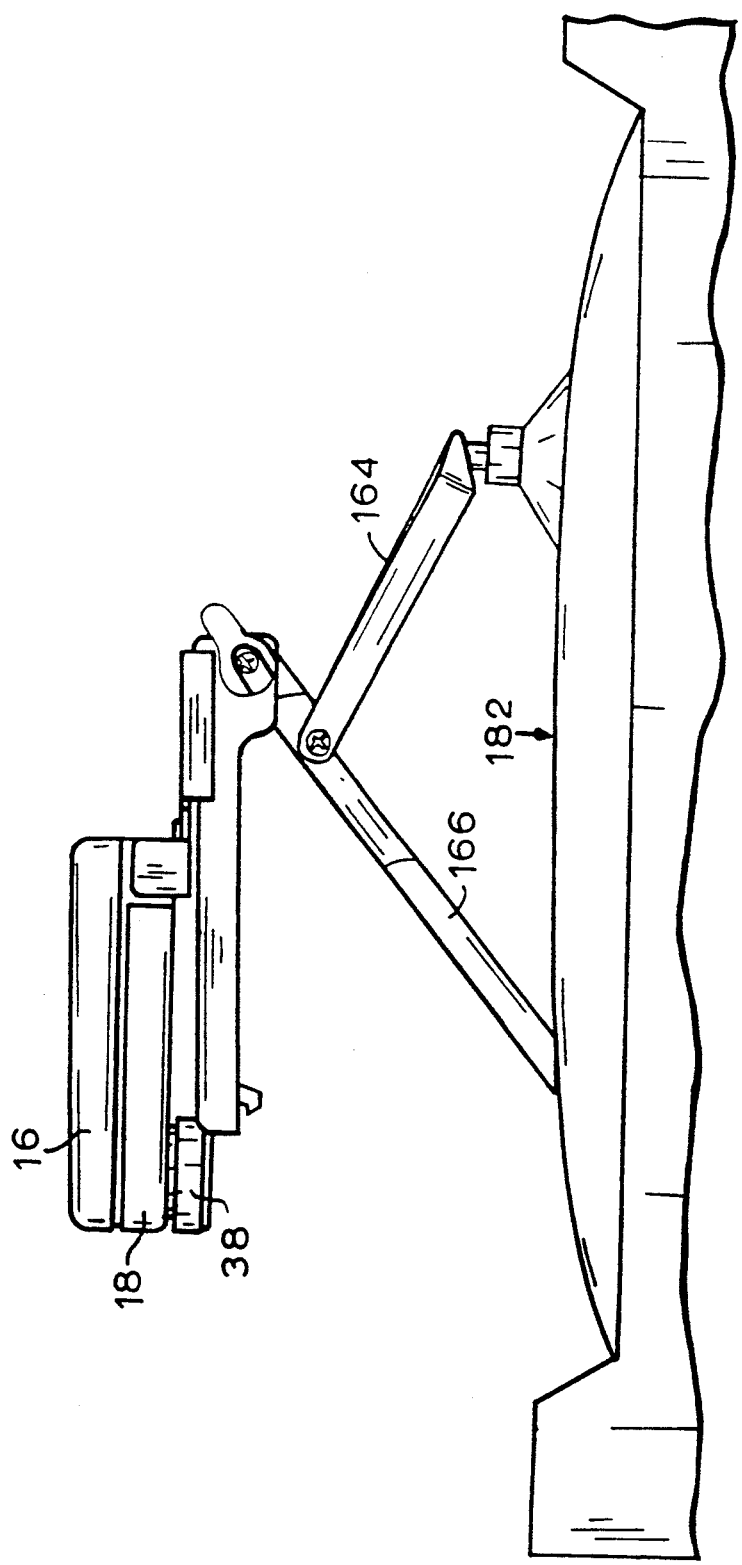
FIG. 19 is a side elevational view of the colorimeter of the present invention mounted on the base of FIG. 18 and fixed to the front surface of a video screen.

The colorimeter of the present invention is especially useful in measuring emitted light, such as from a video monitor. For this purpose, a tripod 160 comprising a base 162 and legs 164, 166, 168 is provided. A bracket 170 attached to the base 162 carries shoulders 172, 174 which mate with slots 20, 22 of the pod 12. A locking mechanism 176 allows the orientation of the base 162 with respect to the legs 164-168 to be readily changed. Suction cups 178, 180 at the end of two of the legs allow the tripod to be temporarily mounted to a generally flat surface such as a video screen. The pod can thus be stably positioned on the face of a video monitor 182 as shown in FIG. 19, in order to analyze light emitted from the monitor. The tripod may advantageously be of the type commonly sold for cameras, modified by the addition of the bracket 170 to accommodate the pod 12.

We claim:

1. A colorimeter for measurement of transmitted, reflected, emitted and incident light, comprising
   a pod
   (i) having a detector module including a plurality of elements responsive to light of different wavelength for providing signals indicative of the color content of light being analyzed,
   (ii) having means for mounting said pod for colorimetric measurements,
   (iii) having means for illuminating an object to be examined,
   (b) a base having
   (1) means for detachably receiving said pod therein and
   (2) means forming an aperture surrounding and restricting an area from which reflected and transmitted light is to be received from an object being analyzed, and
   (c) a head detachably mounted directly on said detector module and passing light to be analyzed to said module.

2. A colorimeter according to claim 1 in which said pod includes a first switch actuable when said head is rotated past a predetermined position with respect to said base to thereby provide a first signal indicating that the head is in position for measurement, and including means on said pod for actuation of said switch when said head is rotated past said predetermined position.

3. A colorimeter according to claim 2 which further includes a second switch on said pod actuable by a user to initiate a measurement when said first switch has been actuated.

4. A colorimeter according to claim 1 in which said head includes at least one channel extending therethrough for transmitting light from a source to said object.

5. A colorimeter according to claim 4 in which said head includes a second channel, distinct from said first channel, for receiving light reflected from said object.

6. A colorimeter according to claim 4 in which said first channel is formed wider at the inner end of the illumination than at the outer end thereof to thereby accommodate slight misalignments in the positioning of said light source.

7. A colorimeter according to claim 1 in which said pod includes circumferential locator means associated with said detector module and in which said head includes corresponding means cooperate with said locator means for fixing the circumferential position of said head relative to said detector module when the two are mounted together.

8. A colorimeter according to claim 6 which further includes securing means associated with said detector module and in which said head includes corresponding means cooperate with said securing means for securing said head to said detector when the two are mounted together.

9. A colorimeter according to claim 1 in which said head includes a resilient sealing element around an outer periphery thereof to seal said head against the entrance of stray light during a measurement.

10. A colorimeter according to claim 9 in which said sealing element comprises an O-ring.

* * * * *

UNITED STATES PATENT AND TRADEMARK OFFICE
CERTIFICATE OF CORRECTION

PATENT NO. : 5,168,320
DATED : December 1, 1992
INVENTOR(S) : Lutz, et. al.

It is certified that error appears in the above-indentified patent and that said Letters Patent is hereby corrected as shown below:

On the Title page, item [21] Appl. No. should be --579,053--, not "322,217".
                item [22] The filing date of the application should be --September 7, 1990--; not March 13, 1989".

Column 6, line 54, "cooperate" should be --cooperable--.

Column 6, line 61, "cooperate" should be --cooperable--.

Signed and Sealed this

Fifteenth Day of March, 1994

Attest:

BRUCE LEHMAN

Attesting Officer      Commissioner of Patents and Trademarks